United States Patent
Krenn et al.

(10) Patent No.: US 10,941,820 B2
(45) Date of Patent: Mar. 9, 2021

(54) ONE-WAY ROLLER CLUTCH

(71) Applicant: KNORR-BREMSE Systeme fuer Nutzfahrzeuge GmbH, Munich (DE)

(72) Inventors: Daniel Krenn, Passau (DE); Johannes Wahl, Ebersburg (DE); Alexander Moser, Vilshofen (DE); Markus Molnar, Fuerstenzell (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 272 days.

(21) Appl. No.: 15/727,201

(22) Filed: Oct. 6, 2017

(65) Prior Publication Data

US 2018/0031056 A1 Feb. 1, 2018

Related U.S. Application Data

(63) Continuation of application No. PCT/EP2016/057606, filed on Apr. 7, 2016.

(30) Foreign Application Priority Data

Apr. 9, 2015 (DE) .............. 20 2015 101 730.8

(51) Int. Cl.
*F16D 41/067* (2006.01)
*F16D 41/06* (2006.01)

(52) U.S. Cl.
CPC .... *F16D 41/067* (2013.01); *F16D 2041/0605* (2013.01); *F16D 2041/0608* (2013.01)

(58) Field of Classification Search
CPC .................. F16D 41/067; F16D 2041/0605
See application file for complete search history.

(56) References Cited

U.S. PATENT DOCUMENTS

| | | | | |
|---|---|---|---|---|
| 2,835,363 A | * | 5/1958 | Long | F16D 41/067 192/45.007 |
| 3,500,977 A | | 3/1970 | Gehrke | |
| 3,917,036 A | * | 11/1975 | Johnson | F16D 41/067 192/45.016 |

(Continued)

FOREIGN PATENT DOCUMENTS

| CN | 103375508 A | 10/2013 |
|---|---|---|
| CN | 203453337 U | 2/2014 |

(Continued)

OTHER PUBLICATIONS

Chinese-language Office Action issued in counterpart Chinese Application No. 201680025906.6 dated Sep. 26, 2018 with English translation (13 pages).

(Continued)

*Primary Examiner* — Mark A Manley
(74) *Attorney, Agent, or Firm* — Crowell & Moring LLP

(57) ABSTRACT

A one-way roller clutch, in particular for an adjuster of a disc brake, includes an inner body having an outer lateral surface, an outer ring, which covers the outer lateral surface of the inner body by way of an inner lateral surface in such a way that a clamping gap is formed, and a roller cage. The roller cage is arranged in the clamping gap. Spring-loaded clamping rollers are held in a rollable manner and are supported on respective ramp surfaces. The roller cage is retained on the inner body for conjoint rotation.

6 Claims, 8 Drawing Sheets

(56) References Cited

U.S. PATENT DOCUMENTS

| | | | | |
|---|---|---|---|---|
| 3,993,176 | A * | 11/1976 | Marola | F16D 41/067 192/45.01 |
| 5,279,399 | A * | 1/1994 | Riggle | F16D 41/067 192/45.014 |
| 6,170,626 | B1 | 1/2001 | Loex | |
| 6,343,682 | B1 * | 2/2002 | Terada | C10M 169/02 192/45.015 |
| 7,182,184 | B2 * | 2/2007 | Baumgartner | F16D 55/225 188/1.11 L |
| 7,926,626 | B2 | 4/2011 | Iraschko | |
| 2005/0050983 | A1 | 3/2005 | Wehr et al. | |
| 2008/0078647 | A1 | 4/2008 | Watanabe et al. | |
| 2011/0108382 | A1 * | 5/2011 | Takada | F16D 41/067 192/45.013 |
| 2013/0092493 | A1 * | 4/2013 | Hsueh | F16D 41/067 192/45.011 |
| 2013/0283949 | A1 | 10/2013 | Fujiwara | |
| 2015/0075937 | A1 * | 3/2015 | Chen | F16D 41/067 192/45.005 |
| 2016/0138663 | A1 * | 5/2016 | Mori | F16D 41/067 192/45.004 |

FOREIGN PATENT DOCUMENTS

| | | |
|---|---|---|
| DE | 197 33 026 A1 | 2/1999 |
| DE | 102 16 957 A1 | 11/2003 |
| DE | 10 2004 037 771 A1 | 3/2006 |
| GB | 2 117 066 A | 10/1983 |
| JP | 61-109926 A | 5/1986 |
| JP | WO2014/203583 * | 12/2014 |
| WO | WO 96/33354 A1 | 10/1996 |

OTHER PUBLICATIONS

International Search Report (PCT/ISA/210) issued in PCT Application No. PCT/EP2016/057606 dated Jul. 14, 2016 with English-language translation (Seven (7) pages).

German-language Written Opinion (PCT/ISA/237) issued in PCT Application No. PCT/EP2016/057606 dated Jul. 14, 2016 (Five (5) pages).

Chinese-language Office Action issued in counterpart Chinese Application No. 201680025906.6 dated Oct. 23, 2019 with English translation (eight (8) pages).

* cited by examiner

ONE-WAY ROLLER CLUTCH

CROSS REFERENCE TO RELATED APPLICATIONS

This application is a continuation of PCT International Application No. PCT/EP2016/057606, filed Apr. 7, 2016, which claims priority under 35 U.S.C. § 119 from German Patent Application No. 20 2015 101 730.8, filed Apr. 9, 2015, the entire disclosures of which are herein expressly incorporated by reference.

BACKGROUND AND SUMMARY OF THE INVENTION

The invention relates to a one-way roller clutch, in particular for an adjuster of a disc brake.

A one-way roller clutch of this type is well known and is used, for example, as a functional part of an adjuster for a disc brake, with which a clearance changing due to wear, i.e. the distance between a brake pad and a brake disc, is compensated for. Such an adjuster is discussed in DE 10 2004 037 771 A1.

WO 96/33 354 A1 discloses a one-way roller clutch, in which ramp surfaces are formed on the inner lateral surface of an outer ring. The roller cage is inserted here into the intermediate space, which forms a clamping gap, between the inner lateral surface of the outer ring and an outer lateral surface of the inner body, wherein clamping rollers, which are spring loaded in the direction of rotation of the outer ring, are supported on the associated ramp surfaces.

The lack of securing of the roller cage in relation to the inner body and the outer ring makes it possible for malfunctions to occur during the relative rotation of the outer ring with respect to the inner body.

The invention is based on the object of developing a one-way roller clutch of the type in question in such a manner that its functional reliability is improved with little outlay in terms of design and manufacturing.

This object is achieved by a one-way roller clutch including an inner body having an outer lateral surface, an outer ring covering the outer lateral surface of the inner body with an inner lateral surface such that a clamping gap is formed, and a roller cage which is arranged in the clamping gap and in which spring loaded clamping rollers are mounted in a rollable manner and are supported on one ramp surface each. The roller cage is held on the inner body in a manner secure against rotation.

Owing to the fact that, according to the invention, the roller cage is fixedly positioned, a forced movement as it were of the clamping rollers both during clamping and during release is ensured. The functional reliability of the entire one-way roller clutch is therefore significantly improved.

According to an advantageous development of the invention, the roller cage is held on the inner body in a form fitting manner, for which purpose the outer lateral surface of the inner body can have a polygonal contour. In this case, the surfaces arising in each case between two corners form the ramp surfaces on which the associated clamping rollers are firstly supported and, in the clamping position, are secondly supported on the inner lateral surface of the outer ring.

In addition or as an alternative, as a further form fitting variant, the roller cage can have at least one axially extending stud which is inserted into a matched opening in a radially oriented flange of the inner body.

It is also contemplated, for the form fitting connection, for the outer lateral surface, contoured in the form of a polygon, of the inner body to be provided in the corner regions with axial grooves in which beads which are matched thereto and are integrally formed on the inner side of the roller cage engage. The beads are arranged in the regions which bound windows of the roller cage. In the windows a respective clamping roller is positioned with a spring device. Of course, an opposite arrangement of the form fitting elements is also possible, i.e. the axial grooves on the roller cage and the beads on the inner body.

The spring device includes an abutment element and a pressure piece. The pressure piece lies against the clamping roller and is displaceable under spring loading relative to the abutment element. The abutment element and/or the pressure piece are matched in the circumferential direction on their side facing the inner lateral surface of the outer ring to the contour of the lateral surface, i.e. are curved convexly.

A compression spring with which the pressure piece is pressable against the clamping roller is arranged between the abutment element and the pressure piece, wherein the abutment element is supported on the side lying opposite the clamping roller on a wall bounding the window. The contact side of the pressure piece on the clamping roller is shaped in a manner approximately corresponding to the radius of the clamping roller.

As mentioned, the abutment element and the pressure piece are connected to each other so as to be movable relative to each other. This can take place via form fitting connection devices, such as pins, studs or the like, or by said compression spring which is fastened to the two components, wherein, for this purpose, pins onto which the compression spring is pushed and held in a frictionally engaging manner can be arranged on the abutment element and/or the pressure piece.

The compression spring itself can be of helical design with a round outline or with a polygonal outline.

Instead of a frictionally engaging connection, the compression spring can also be fastened in a form fitting manner by means of suitable form fitting connection devices.

According to a further aspect of the invention, the abutment element and the pressure piece are of cuboidal design and are guided in the window in a manner substantially free from play. In this case, the abutment element and the pressure piece can be of symmetrical design, preferably of identical design, in respect of their cuboidal shape. This permits simple and cost effective production and assembly of the spring device which is present in the form of a preassembled constructional unit.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 6A, 6B through 10A, 10B show schematic illustrations of various exemplary embodiments of a detail according to the invention in partially different assembly positions.

DETAILED DESCRIPTION OF THE DRAWINGS

Figure 1:
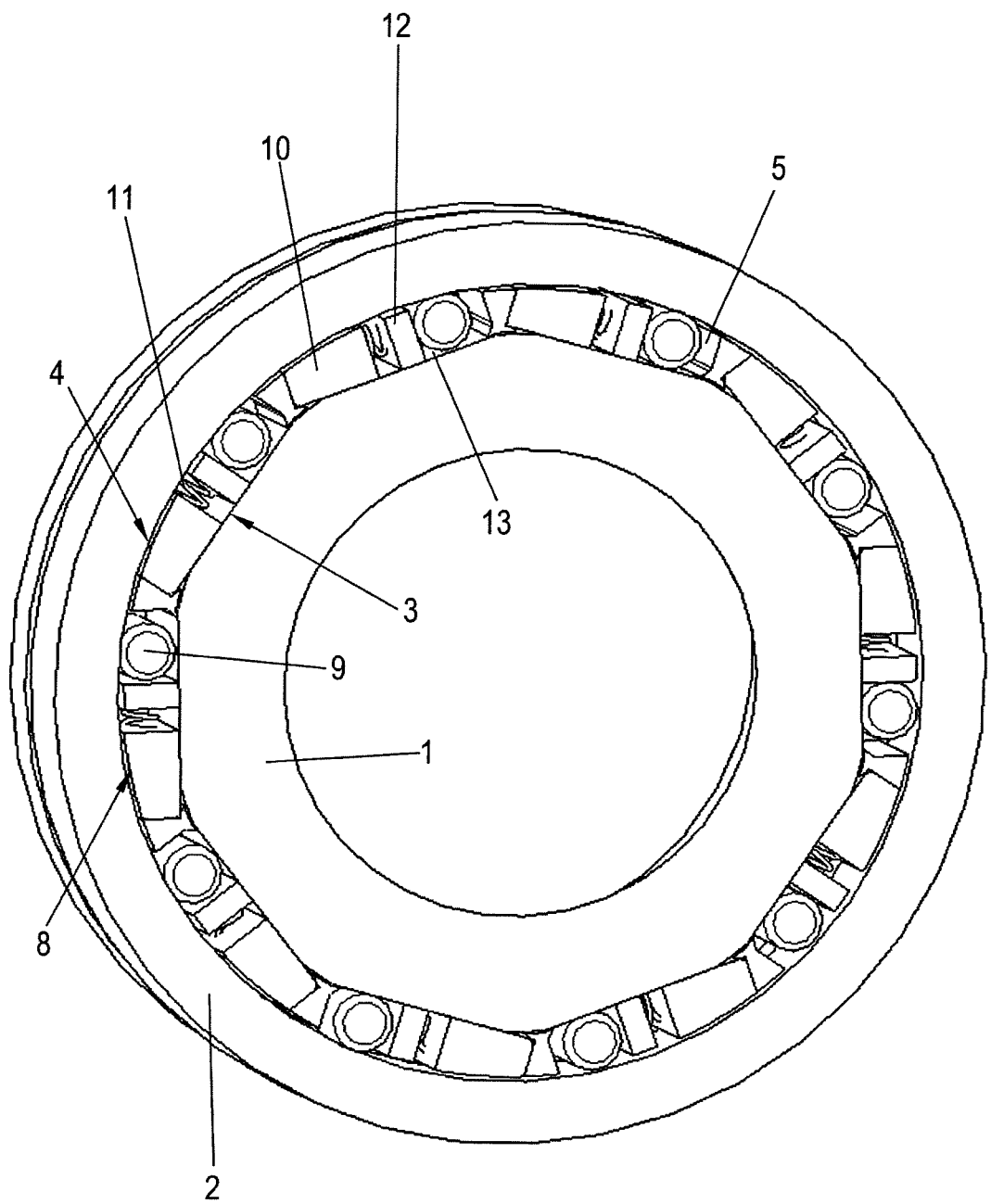
FIG. 1 shows a one-way roller clutch in a side view.
Figure 2:
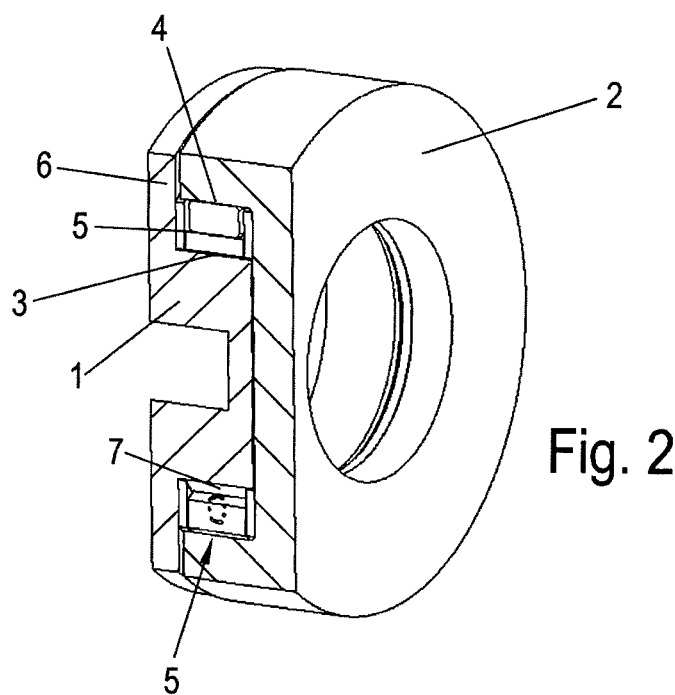
FIG. 2 shows the one-way roller clutch in a sectioned perspective view.

FIGS. 1 and 2 illustrate a one-way roller clutch, with an inner body 1 which has an outer lateral surface 3 and is designed as a ring, an outer ring 2 covering the outer lateral surface 3 of the inner body 1 with an inner lateral surface 4 such that a clamping gap 5 is formed, and a roller cage 7 which is arranged in the clamping gap 5 and in which spring loaded clamping rollers 9 are mounted and are supported on one ramp surface 13 each.

In the clamping position, the clamping rollers 9 lie both against the ramp surfaces 13 and against the inner lateral surface 4 of the outer ring 2. A freewheel position can be seen in FIG. 1, in which the respective clamping roller 9 is exposed in relation to the inner lateral surface 4 of the outer ring 2 to such an extent that a relative rotation of the outer ring 2 in relation to the inner body 1 is easily possible.

Figure 3:
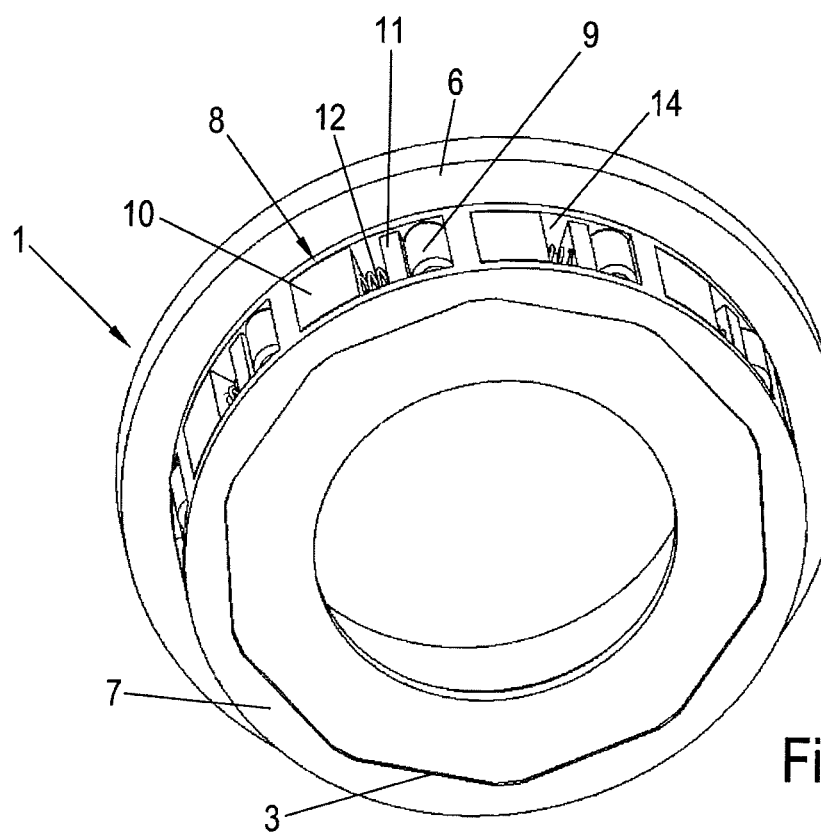
FIG. 3 shows a detail of the one-way roller clutch, likewise in a perspective view.

FIG. 3 illustrates the one-way roller clutch without an outer ring 2, i.e. only the inner body 1 with the roller cage 7 which is pushed onto the outer lateral surface 3 is shown.

The roller cage 7 has, distributed over the circumference, open windows 14, in each of which, on the one hand, a clamping roller 9 is mounted and, on the other hand, a spring device 8 is positioned. The spring device lies under spring loading against the clamping roller 9.

Torque is transmitted between the outer ring 2 and the inner body 1 in a manner known per se by the clamping rollers 9 becoming wedged in the clamping gap 5 between the outer ring 2 and the inner body 1. This clamping function is secured by way of the spring device 8 which is described in detail with respect to FIGS. 6 9.

According to the invention, the roller cage 7 is held in a manner secure against rotation on the inner body 1, for which purpose the outer lateral surface 3 of said inner body 1 is designed, in the example, as a polygon in its circumferential contour. The surfaces bounded by the corners form the ramp surfaces 13, while the inner contour of the roller cage 7 is matched to the contour of the outer lateral surface 3, which gives rise to the securing against rotation.

Figure 4:
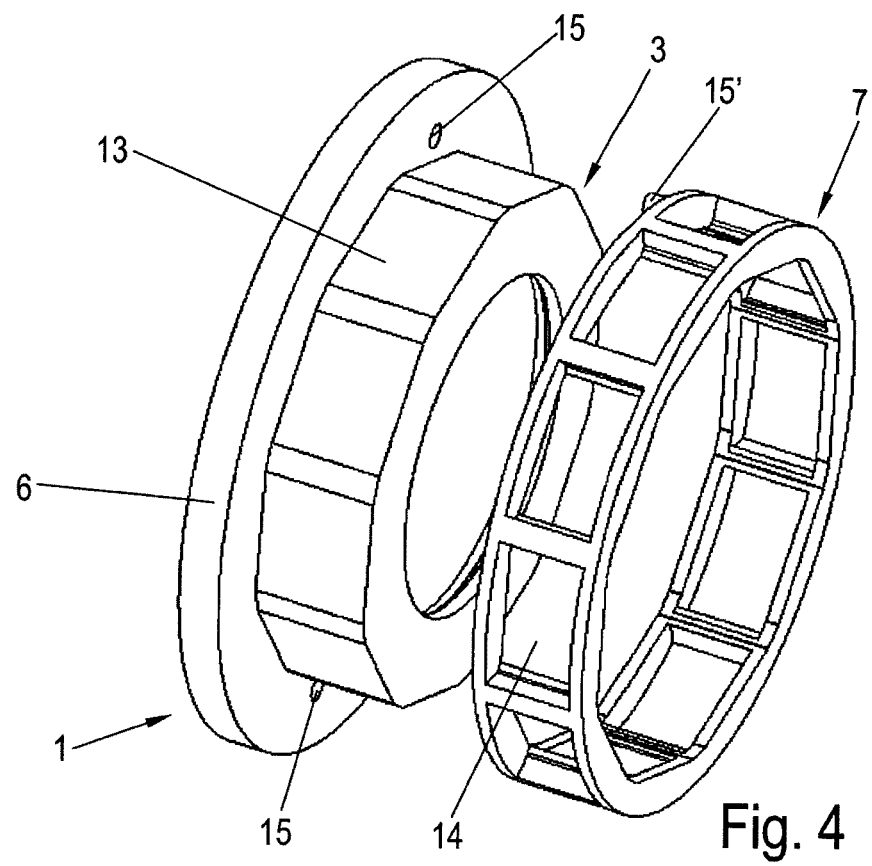
FIGS. 4 and 5 both show an exemplary embodiment of a detail of the one-way roller clutch in an exploded illustration.

FIG. 4 depicts a further embodiment of a possible device for securing against rotation. Bores 15, into which axially oriented studs 15' of the roller cage 7 are inserted, are arranged next to the polygonal contour of the outer lateral surface 3 of the inner body 1 and of the roller cage 7. The bores 15 are introduced here into a circumferential, radially extending flange 6 of the inner body 1.

Figure 5:
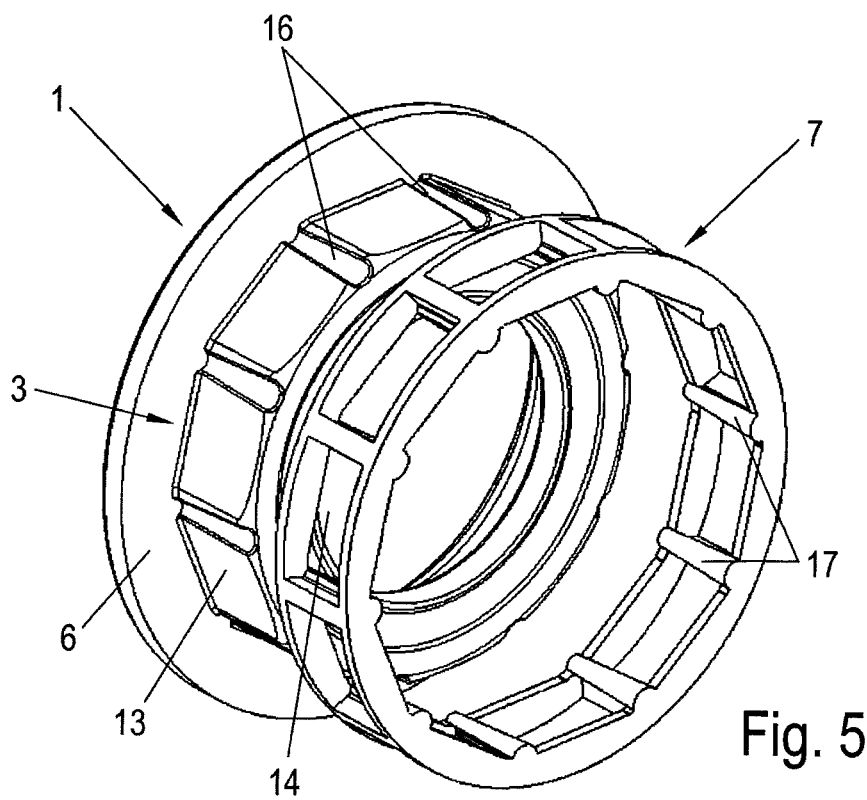

As an alternative thereto, FIG. 5 depicts an embodiment of the device for securing against rotation, in which the ramp surfaces 13 of the outer lateral surface 3 are bounded by channel like grooves 16 in which beads 17 integrally formed on the inner side of the roller cage 7 engage. The grooves 16, like the beads 17, are oriented axially, and therefore the roller cage 7 can easily be pushed on. In an axial extension of the grooves 16, openings can be provided, into which the beads 17 which are extended to this extent are then inserted.

FIGS. 6 to 9 schematically illustrate various exemplary embodiments of the spring device 8, in different assembly steps in each case.

Figure 6A:
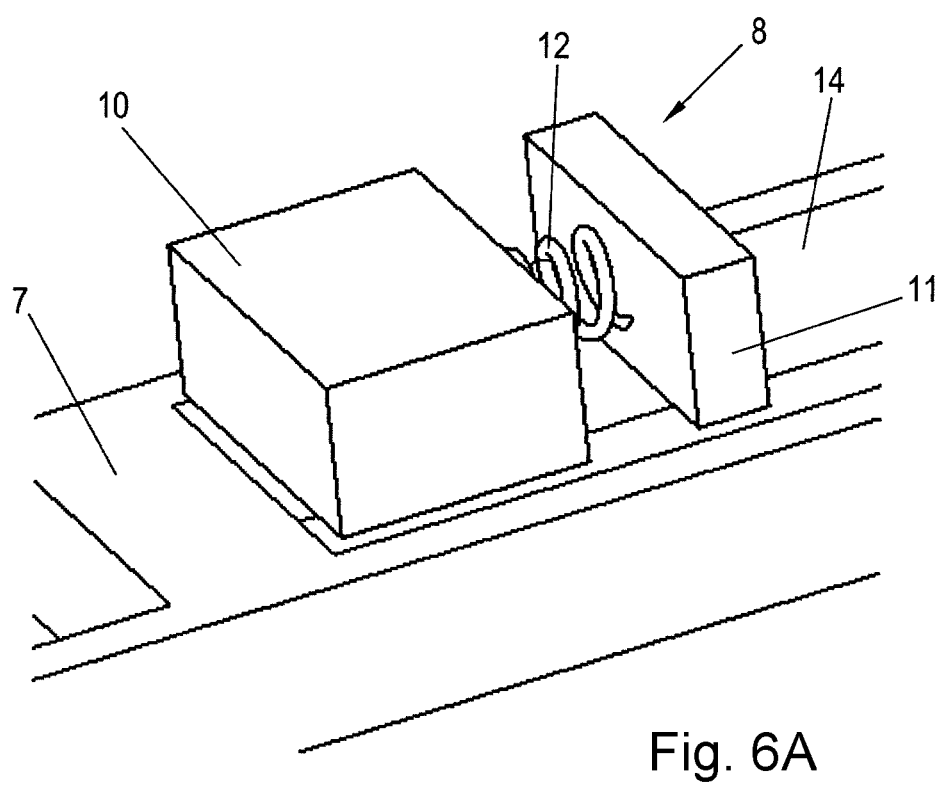
Figure 6B:
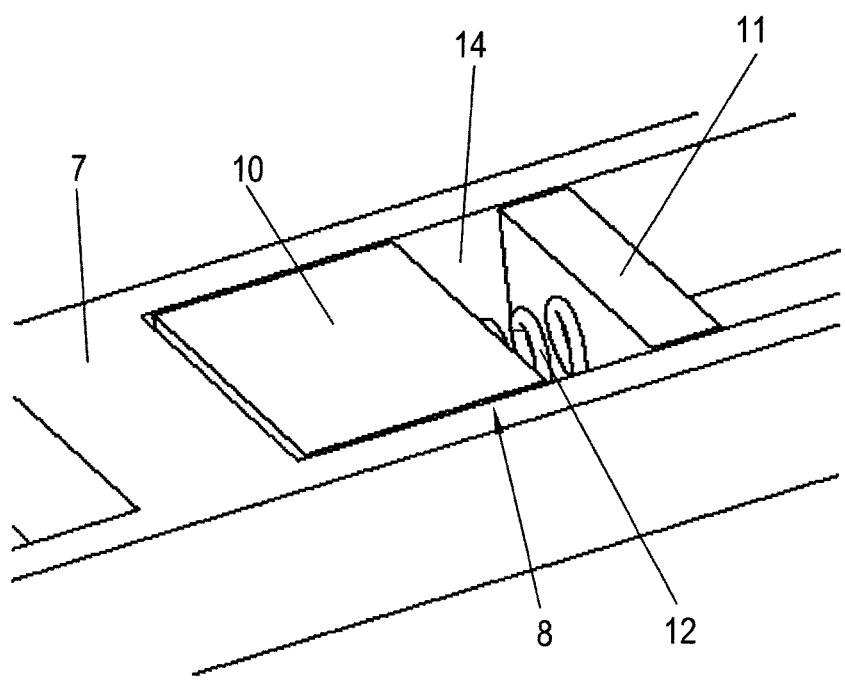

Thus, FIG. 6A shows the spring device 8, consisting of an abutment element 10 and a pressure piece 11, between which a compression spring 12 in the form of a helical spring is fastened to at least one of the two components. The position of the spring device 8 prior to insertion into the window 14 is depicted here, whereas FIG. 6B reproduces the inserted spring device 8.

Figure 7A:
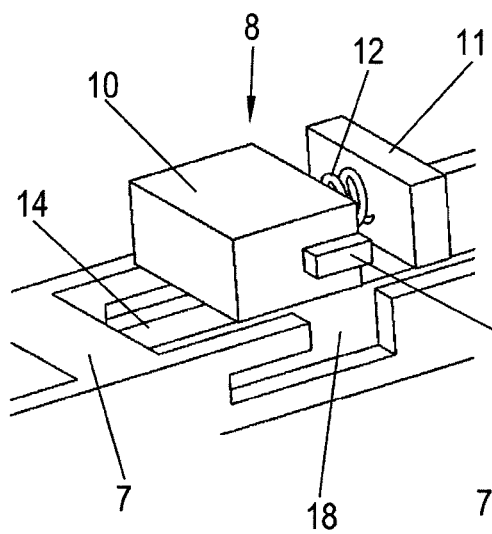
Figure 7B:
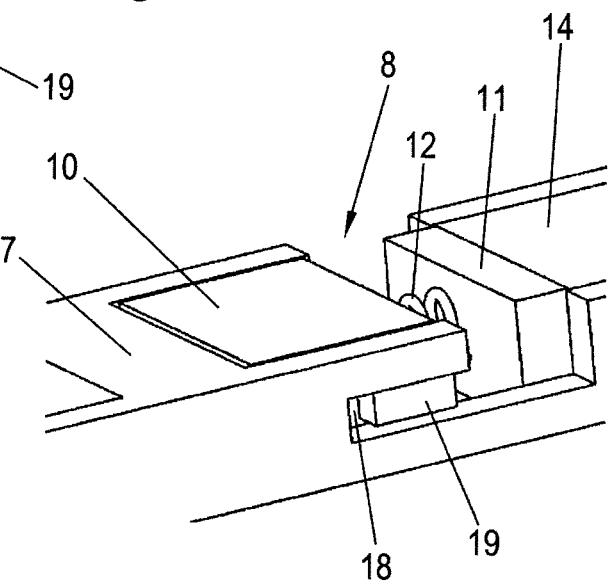

Another variant embodiment of the spring device 8 or the fastening thereof in the roller cage 7 is shown in FIGS. 7 and 8, wherein, in both examples, the abutment element 10 has webs 19 on opposite sides. The abutment element 10 according to FIG. 7A is fitted with the webs 19 into upwardly open slots 18 of the wall of the window 14, corresponding to the depiction in FIG. 7B.

Figure 8A:
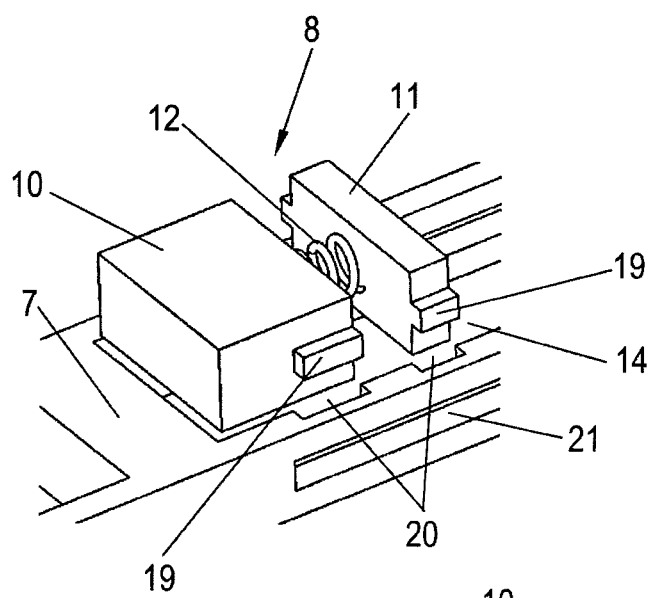
Figure 8B:
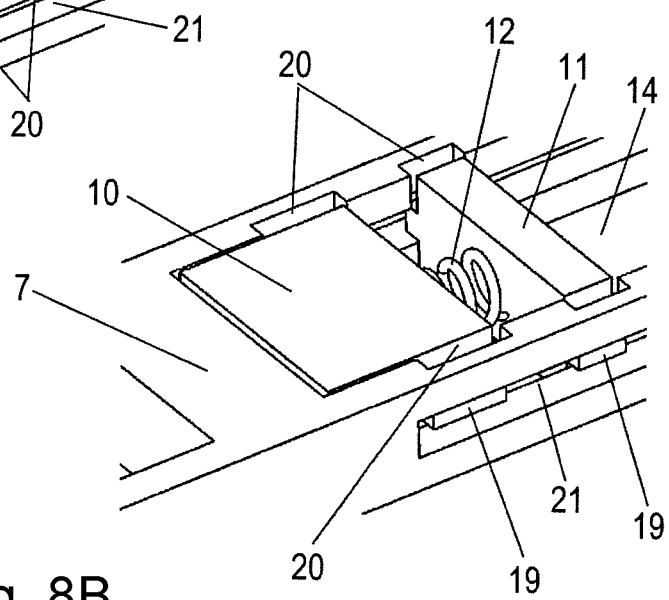

In the example shown in FIG. 8, the pressure piece 11 also has webs 19, wherein the latter, like the webs 19 of the abutment element 10, are introduced from above by means of grooves 20 into a longitudinal slot 21 of the wall of the window 14, said longitudinal slot forming a longitudinal guide for the spring device 8 as a whole. FIG. 8A also shows a position here prior to the insertion of the spring device 8 into the window 14, while the inserted position can be seen in FIG. 8B.

Figure 9A:
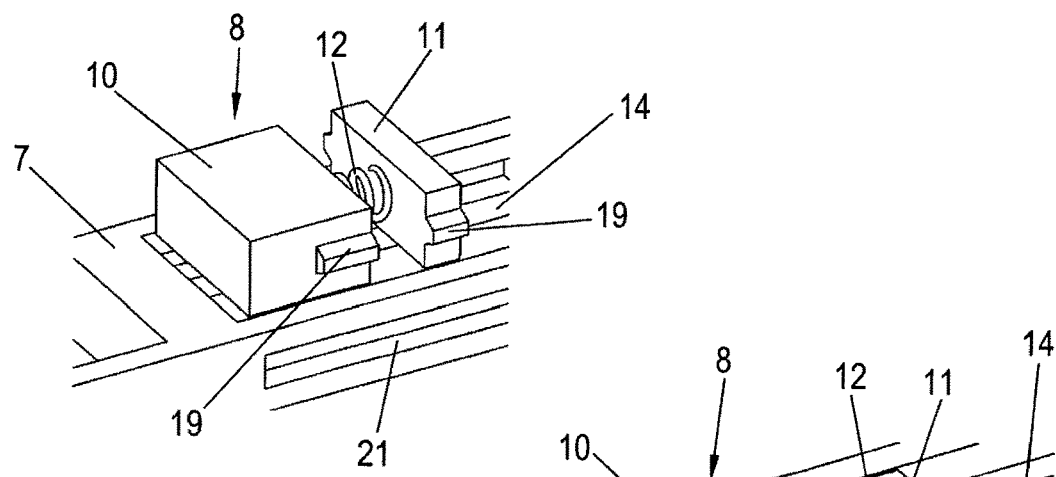
Figure 9B:
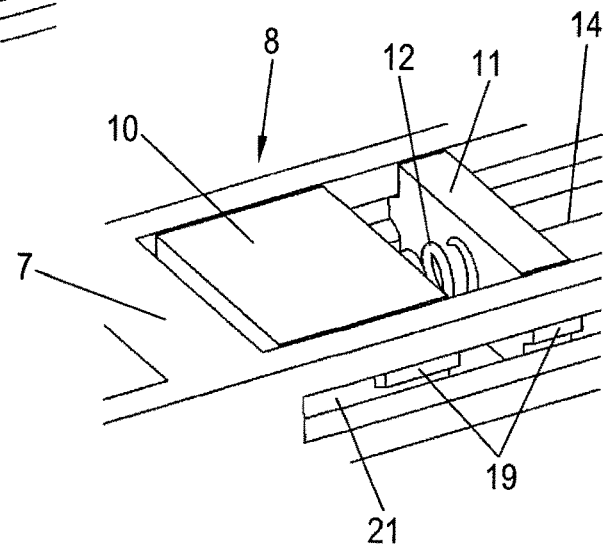

A design of the spring device 8 comparable to the example according to FIGS. 8A and 8B are illustrated in FIGS. 9A and 9B, wherein here, rather than a groove being provided for the introduction into the longitudinal slot 21, the abutment element 10 and the pressure piece 11 are inserted in practice by bending up the side walls of the window 14.

Figure 10A:
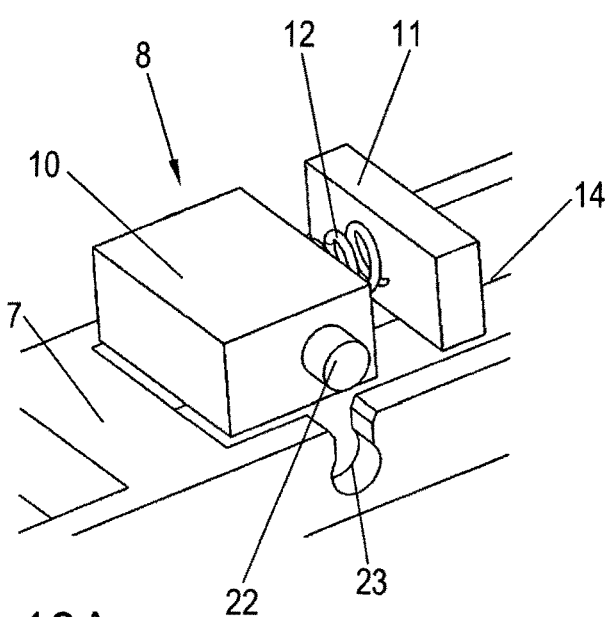
Figure 10B:
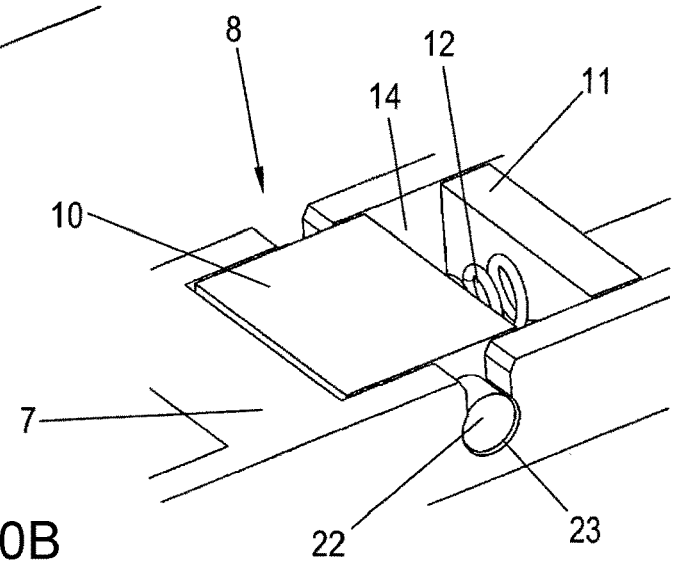

Finally, in FIGS. 10A and 10B, the abutment element 10 with lateral studs 22 can be seen, said lateral studs being inserted into an open elongated hole 23 which is formed upward, i.e. toward the insertion side, in the manner of an open keyhole such that the abutment element 10 is locked in a form fitting manner in the window 14.

Figure 11:
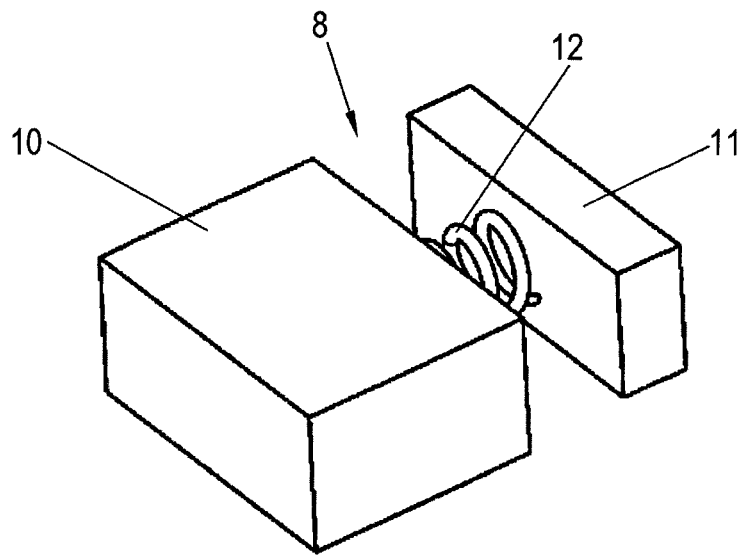
FIGS. 11-16 show schematic illustrations of various exemplary embodiments of a detail according to the invention in partially different assembly positions.

In FIG. 11, the abutment element 10 and the pressure piece 11 are connected to each other by the compression spring 12 being fastened to both parts, and therefore the compression spring 12 in practice forms a connecting element.

Figure 12:
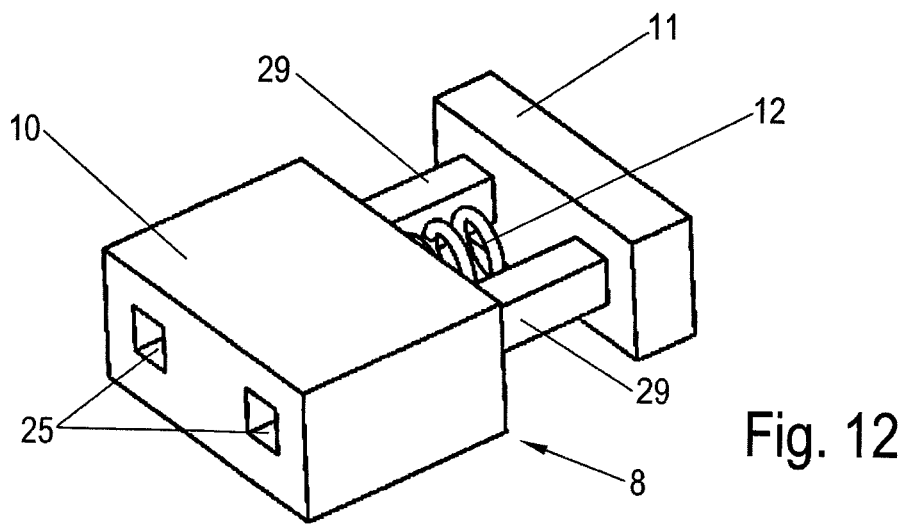
Figure 14:
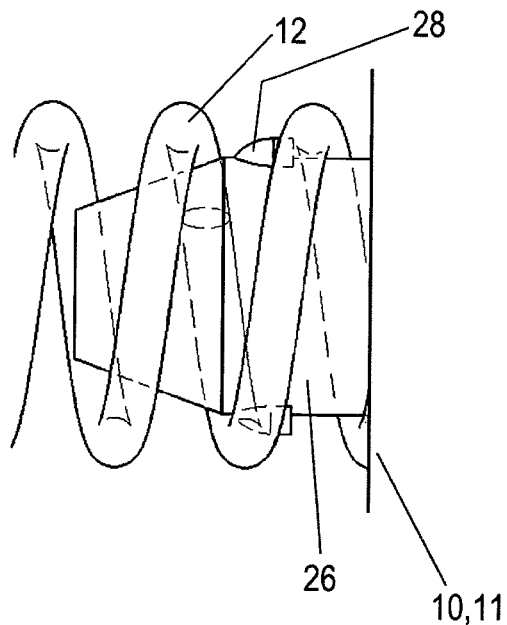

In FIG. 12, the connection is achieved by means of the compression spring 12 which is held against lateral deflection on at least one spike 26, as depicted as a detail in FIG. 14, wherein the spike 26 is integrally formed on the abutment element 10 and/or on the pressure piece 11 and is guided thereon either in a loose, frictionally engaging or form fitting manner. For the form fitting connection, the spike 26 is provided with a stop 28 on which the compression spring 12 having a coil portion is supported, and therefore the compression spring 12 is held secured axially in a form-fitting manner.

For the axial guidance of the pressure piece 11 in relation to the abutment element 10, two guide pins 29 which are arranged in parallel and at a distance from each other are fastened to the pressure piece 11 and are guided in passage openings 25 in the abutment element 10. The displacement limitation of the pressure piece 11 in relation to the abutment element 10 is achieved here by the locking of the compression spring 12, according to FIG. 14.

Figure 13:
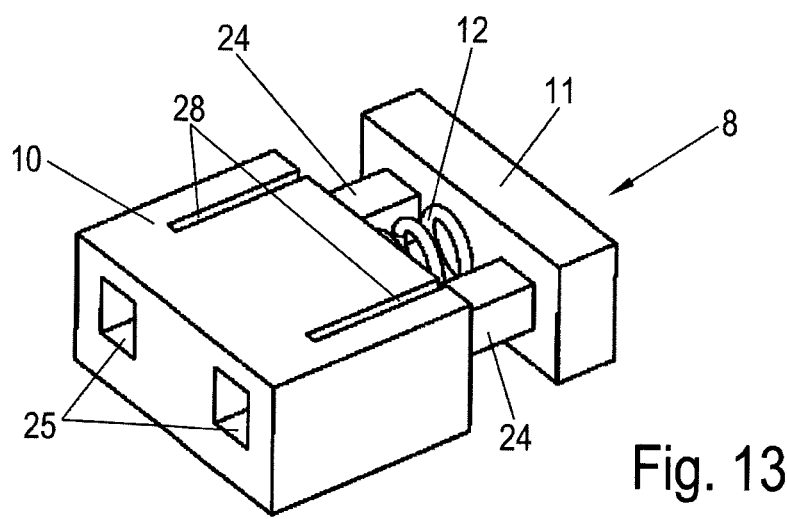
Figure 15:
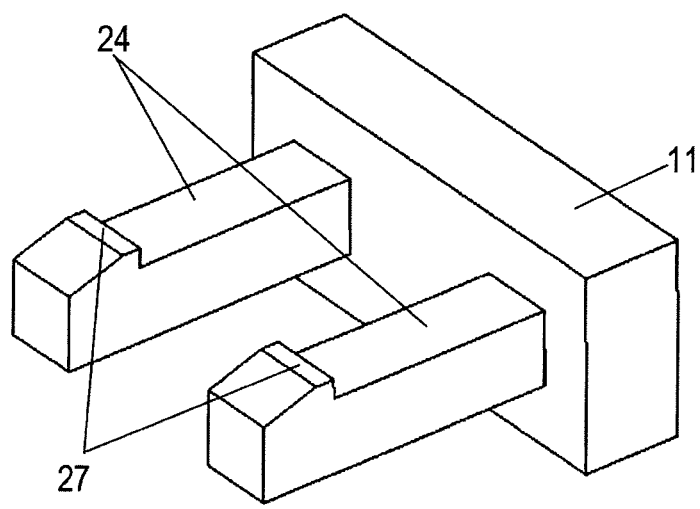

In the example shown in FIG. 13, the sliding limitation takes place by means of pins 24 which are held on the pressure piece 11 and, as FIG. 15 reproduces as a detail of the pressure piece 11, are provided at their free end with hooks 27 which engage behind the abutment element 10 after being pushed into passage openings 25 therein.

For the simple pushing of the pins 24 into the passage openings 25, in the region of the passage openings 25 the abutment element 10 has longitudinal slots 28, by means of which the passage openings 25 are expanded in regions when the pins 24 are pushed in.

Figure 16:
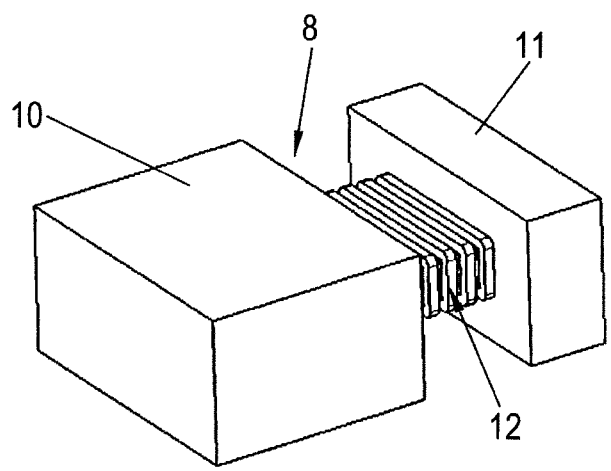

Finally, FIG. 16 illustrates the compression spring 12 in the form of a square spring, wherein the latter has particular stability in relation to buckling.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A one-way roller clutch for an adjuster of a disc brake, comprising:
    an inner body having an outer lateral surface, wherein the outer lateral surface of the inner body is configured as a polygon in a circumferential contour;
    an outer ring covering the outer lateral surface of the inner body with an inner lateral surface in such a way that a clamping gap is formed; and
    a roller cage arranged in the clamping gap, wherein
        spring-loaded clamping rollers are mounted in a rollable manner in the roller cage, each clamping roller being supported on a respective ramp surface,
        the roller cage is retained on the inner body in a rotationally secure manner, wherein in order to secure the roller cage against rotations openings are provided in a radial flange of the inner body, and studs which are oriented axially and are integrally formed on the roller cage, are inserted into the openings,
        a spring device lying resiliently against an associated clamping roller is provided, in each case, in respective windows of the roller cage,
        the spring device comprises an abutment element, which is held in a fixed position in a respective window of the roller cage, and a pressure piece, wherein the abutment element is a separate structure from the roller cage,
        a compression spring is arranged between the abutment element and the pressure piece, wherein the compression spring, the abutment element, and the pressure piece are separate structures,
        the pressure piece lies against the clamping roller, and
        the abutment element has a web which is fit into a slot of a wall of the respective window.

2. The one-way roller clutch as claimed in claim 1, wherein
    the roller cage is held on the inner body in a form-fitting manner.

3. The one-way roller clutch as claimed in claim 1, wherein
    the outer lateral surface of the inner body is circumferentially provided with the ramp surfaces on which the clamping rollers are supported.

4. The one-way roller clutch as claimed in claim 1, wherein
    flat surfaces of the polygon form the ramp surfaces supporting the clamping rollers.

5. The one-way roller clutch as claimed in claim 1, wherein
    an inner contour of the roller cage is matched to the circumferential contour of the outer lateral surface of the inner body.

6. The one-way roller clutch as claimed in claim 1, wherein
    the pressure piece is connected to the abutment element so as to be displaceable to a limited extent.

\* \* \* \* \*